(12) United States Patent
Brun et al.

(10) Patent No.: US 6,574,412 B2
(45) Date of Patent: Jun. 3, 2003

(54) METHOD FOR POSITIONING OPTICAL FIBERS

(75) Inventors: Marc G. Brun, Avon (FR); Jean-Pierre Themont, Montigny sur Loing (FR); Sylvain M. Gremetz, Vax le Penil (FR)

(73) Assignee: Corning Incorporated, Corning, NY (US)

( * ) Notice: Subject to any disclaimer, the term of this patent is extended or adjusted under 35 U.S.C. 154(b) by 34 days.

(21) Appl. No.: 09/942,337

(22) Filed: Aug. 29, 2001

(65) Prior Publication Data

US 2002/0031325 A1 Mar. 14, 2002

(30) Foreign Application Priority Data

Sep. 8, 2000 (EP) ............................... 00402488

(51) Int. Cl.[7] .................................. G02B 6/00
(52) U.S. Cl. .................... 385/137; 385/114; 385/120
(58) Field of Search .................... 156/293; 385/135, 385/136, 137, 147, 100, 114, 120

(56) References Cited

U.S. PATENT DOCUMENTS

| 5,135,590 A | 8/1992 | Basavanhally et al. ....... 156/64 |
| 5,178,723 A | 1/1993 | Nguyen |
| 5,194,105 A | 3/1993 | Nguyen ........................ 156/293 |
| 5,506,928 A | 4/1996 | Evan et al. ................... 385/136 |
| 5,937,132 A | 8/1999 | Labeye et al. ............... 385/137 |
| 6,240,235 B1 * | 5/2001 | Uno et al. .................... 385/137 |

FOREIGN PATENT DOCUMENTS

| GB | 2178184 A | 2/1997 |
| JP | 406331848 A | 12/1994 |

* cited by examiner

Primary Examiner—Euncha Cherry
(74) Attorney, Agent, or Firm—James V. Suggs; Eric M. Smith

(57) ABSTRACT

The present invention includes a tool (300) for positioning optical waveguide fibers (310) on an adhesive coated substrate (302) including a holder (301) and a pressure source. The holder (301) includes a chamber (314) coupled to the pressure source and multiple recesses (308) configured to position the optical waveguide fibers (310). Each recess (308) includes a reference surface (312) and is connected to the chamber (314) by a passageway (316). The pressure source is configured to selectively increase and decrease the pressure in the chamber (314). The invention also includes a method of making optical waveguide fiber array blocks using the tool (300).

6 Claims, 3 Drawing Sheets

METHOD FOR POSITIONING OPTICAL FIBERS

CROSS REFERENCE TO RELATED APPLICATION

This application claims the benefit of European Application No. 00402488.1, filed Sep. 8, 2000.

BACKGROUND OF THE INVENTION

1. Field of the Invention

The present invention relates generally to optical waveguide fiber arrays, and particularly to a tool for positioning arrays of optical waveguide fiber.

2. Technical Background

Optical fiber array blocks are used to connect multiple optical waveguide fibers to optical devices, for example, optical switch fabrics. One approach to making optical fiber array blocks is to use a base plate with parallel grooves. Typically, these grooves are etched, machined or molded and the final position of the optical waveguide fibers is a function of the manufacturing tolerances involved in fabricating the grooved base plates. Each of these manufacturing technologies has difficulty in producing high precision optical waveguide fiber array blocks in large quantities.

The position of the optical waveguide fibers within the array is important because a small misalignment may lead to unacceptably large degradation of an optical signal routed through the optical fiber array block. Therefore the deviation of a single fiber from its desired position can render the entire fiber block unusable.

Furthermore, as optical technology progresses optical devices are increasing in complexity and decreasing in size requiring both more optical waveguide fibers to be attached to a single device and that the optical waveguide fibers be placed closer together.

There is a need to make optical fiber array blocks where the optical waveguide fibers have a small pitch and are positioned with great precision.

SUMMARY OF THE INVENTION

One aspect of the present invention is a method for making fiber arrays. The method includes the step of loading optical waveguide fibers into a positioner having a number of reference surfaces. The method further includes the step of applying adhesive to a planar substrate, thereby forming an adhesive coated surface. The method further includes the step of forming a number of virtual V-grooves with the adhesive coated substrate and the reference surfaces. The method further includes the steps of placing the optical waveguide fibers in the virtual V-grooves and coupling the optical waveguide fibers to the planar substrate.

In another aspect, the present invention includes a tool for positioning optical waveguide fibers on an adhesive coated substrate including a holder and a pressure source. The holder includes a chamber coupled to the pressure source and multiple recesses configured to position the optical waveguide fibers. Each recess includes a reference surface and is connected to the chamber by a passageway. The pressure source is configured to selectively increase and decrease the pressure in the chamber.

In another aspect, the present invention includes a tool for positioning optical waveguide fibers on an adhesive coated substrate to form an optical waveguide fiber array. The tool includes a pressure source configurable to provide either positive or negative pressure and a controller coupled to the pressure source. The controller configures the pressure source to provide either positive or negative pressure. The tool also includes a holder having multiple channels. Each of the channels includes a reference surface. The holder also includes a number of passageways connecting each of the channels to the pressure source. The tool further includes a positioner that positions said holder over the adhesive coated substrate, thereby forming a number of virtual V-grooves with the reference surfaces and the adhesive coated substrate.

In another aspect, the present invention includes a tool for positioning optical waveguide fibers on an adhesive coated substrate to form an optical waveguide fiber array. The tool includes a pressure source configurable to provide either positive or negative pressure and a controller coupled to the pressure source. The controller configures the pressure source to provide either positive or negative pressure. The tool also includes a holder having multiple channels. Each of the channels includes a reference surface. The holder also includes a number of passageways connecting each of the channels to the pressure source. The tool further includes a positioner that brings the adhesive coated substrate into close proximity to the holder, thereby forming a number of virtual V-grooves with the reference surfaces and the adhesive coated substrate.

An advantage of the present invention is that high precision optical waveguide fiber arrays may be made without the need for high precision grooved substrates.

Another advantage of the present invention is that it reduces the costs of precision optical waveguide fiber array blocks.

Another advantage of the present invention is that it optical fiber arrays may be made with out either photolithography or etching.

Another advantage of the present invention is that it is easily adaptable into an automated assembly process.

Another advantage of the present invention is that it does not require the use of a vision system to position the optical fibers to form an array.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
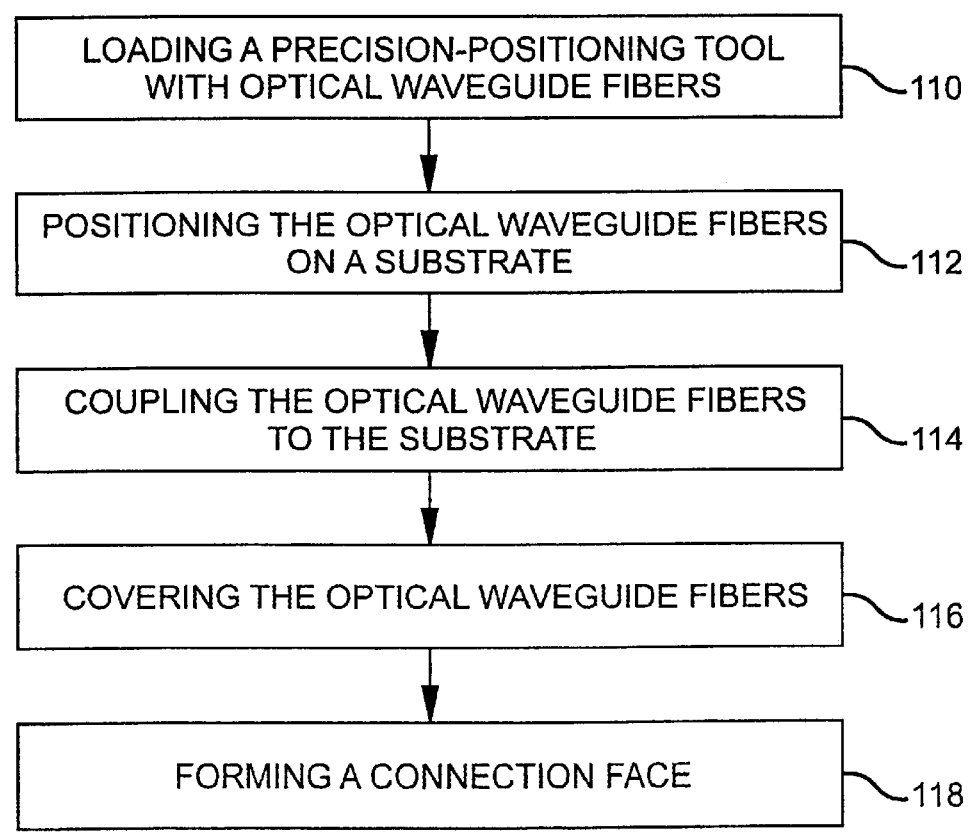
FIG. 1 is a flow chart illustrating the fabrication process steps of the present invention in block diagram form.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the method of the present invention is shown in FIG. 1, and is designated generally throughout by reference numeral 100.

In accordance with the invention, the present invention for a method 100 of making optical waveguide fiber arrays includes a first step 110 of loading optical waveguide fibers into a precision-positioning tool. The optical waveguide fibers are held in the precision-positioning tool by suction.

In accordance with the invention, the present invention for a method 100 of making optical waveguide fiber array blocks may further include a step 112 of positioning the optical waveguide fibers on the substrate. Preferably the substrate has a substantially planar surface coated with a thin layer of adhesive. For example, when the adhesive is an ultra-violet curable adhesive the thickness of the ultra-violet curable adhesive layer is on the order of 5 $\mu$m.

The optical waveguide fibers are positioned on the substrate by bringing the fibers into contact with the adhesive layer and registering each of the optical fibers against a reference surface that is at some angle to the surface. Preferably, the reference surface is part of the precision-positioning tool and is inclined at no more than 90 degrees with respect to the planar surface of the substrate. The optical fibers are placed into contact with the adhesive layer and the reference surface by applying air pressure to the optical waveguide fibers, thereby forcing the optical waveguide fibers into the adhesive layer and against the reference surface. By ensuring that the adhesive layer is of substantially uniform thickness and equal force is applied to each optical waveguide fiber, the fibers can be accurately positioned in two dimensions within 1 $\mu$m of a predetermined position. When the adhesive layer is located on a substantially planar surface the optical waveguide fibers form a planar array.

In accordance with the invention, the present invention for a method 100 of making optical waveguide fiber array blocks may further include a step 114 of curing the adhesive layer, thereby fixing the optical waveguide fibers in place. When an ultra-violet curable adhesive is used to make the adhesive layer, the adhesive layer is cured by irradiating it with ultra-violet light. An ultra-violet curable adhesive provides the advantage that positional shifts due to the curing of the adhesive are minimized. For example, typical ultra-violet curable adhesives used in optical applications shift on the order of 0.25 $\mu$m during curing.

In accordance with the invention, the present invention for a method 100 of making optical fiber array blocks may further include a step 116 of placing a cover over the array of optical waveguide fibers. The cover protects the optical waveguide fibers and is coupled to the substrate. The cover may be a machined or molded cover having recesses to accommodate the optical waveguide fibers. The cover is attached to the substrate providing protection for the optical waveguide fibers. For example, the cover may be adhesively bonded, mechanically fastened, soldered, welded or otherwise affixed to the substrate. The adhesive may be an epoxy adhesive, a thermally curable adhesive or an ultra-violet curable adhesive.

In an alternate embodiment of the invention, the step 116 includes molding a cover around the optical waveguide fibers. The choice of material for molding the cover is readily made by those skilled in the art. For example, the group of materials the cover may be made from include any structural adhesive having a coefficient of thermal expansion equal or close to that of the substrate, for example, MCA-95 adhesive available from Corning Incorporated of Corning, N.Y.

It will be apparent to those of ordinary skill in the pertinent art that modifications and variations can be made to step 116 of the present invention depending on environmental design requirements. For example, the cover could be made from ceramic, metal, silica, silicon, or plastic.

In accordance with the invention, the present invention for a method 100 of making optical waveguide fiber array blocks may further include a 118 of forming a connection face. A connection face allows the optical waveguide fiber array block to be advantageously coupled to an optical device. The connection face may be formed by cutting through the optical waveguide fiber array block transverse to the optical waveguide fibers and then polishing the connection face.

Figure 2:
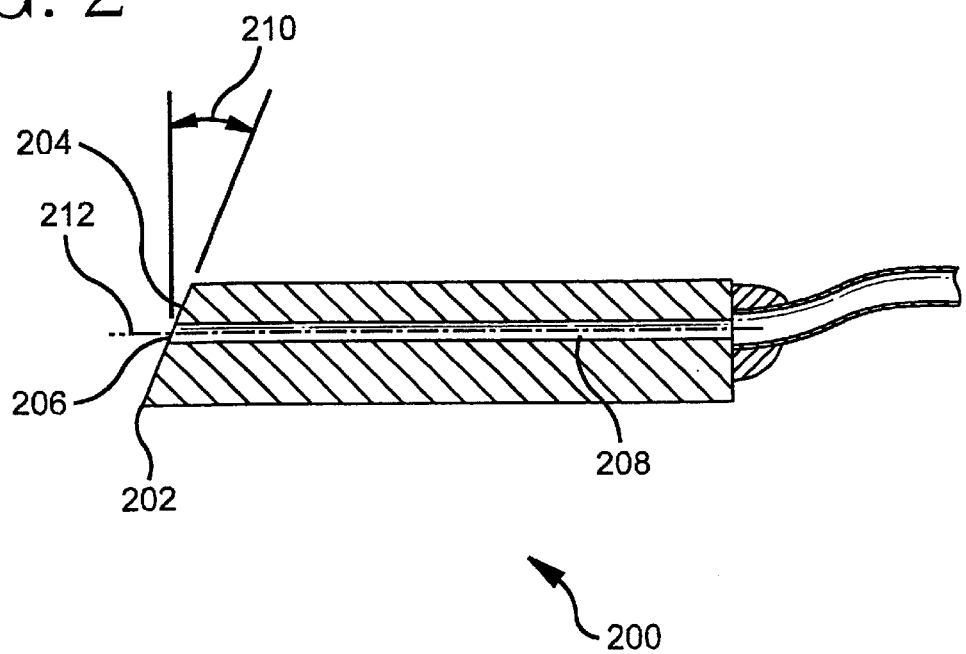
FIG. 2 is a side elevation view of an optical waveguide fiber array block in which the present invention is embodied.

FIG. 2 is a side elevation view of an optical waveguide fiber array block 200 made according to one embodiment of the present invention. Preferably one end 202 of the optical waveguide fiber array block 200 is cut and polished, thereby forming a connection face 204. Preferably the connection face 204 is cut and polished so that the ends 206 of the fibers 208 are beveled 210. Preferably the bevel 210 is inclined at about eight (8) degrees with respect to the fibers' optical axes 212.

Figure 4:
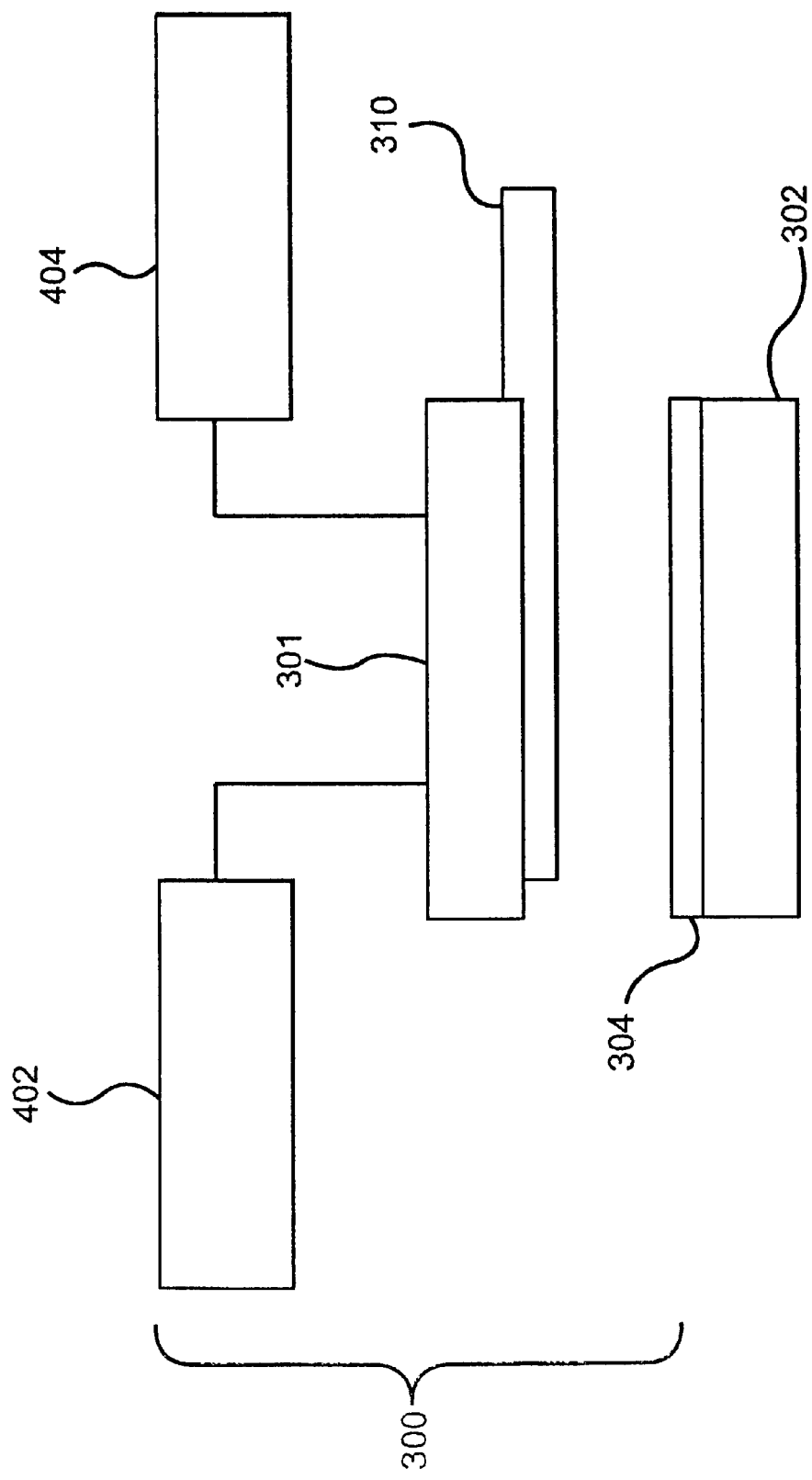
FIG. 4 is a schematic block diagram of a precision-positioning tool in which the present invention is embodied.

In an alternate embodiment of the invention, as embodied herein and as shown in FIG. 4, the present invention includes a precision-positioning tool 300. The precision-positioning tool includes a holder 301, a pressure source 402 and a controller 404. The holder 301 is configured to hold optical waveguide fibers 310 in a predetermined arrangement, such as, for example a planar array. The pressure source 402 is capable of providing both a positive and negative pressure. The controller 404 controls the pressure provided by the pressure source 402 and may also incorporate a positioner that positions the holder 301 over a substrate 302 having an adhesive layer 304. The optical waveguide fibers 310 are seated into the adhesive layer 304 and the adhesive is cured securing the optical waveguide fibers 310 in place.

Figure 3:
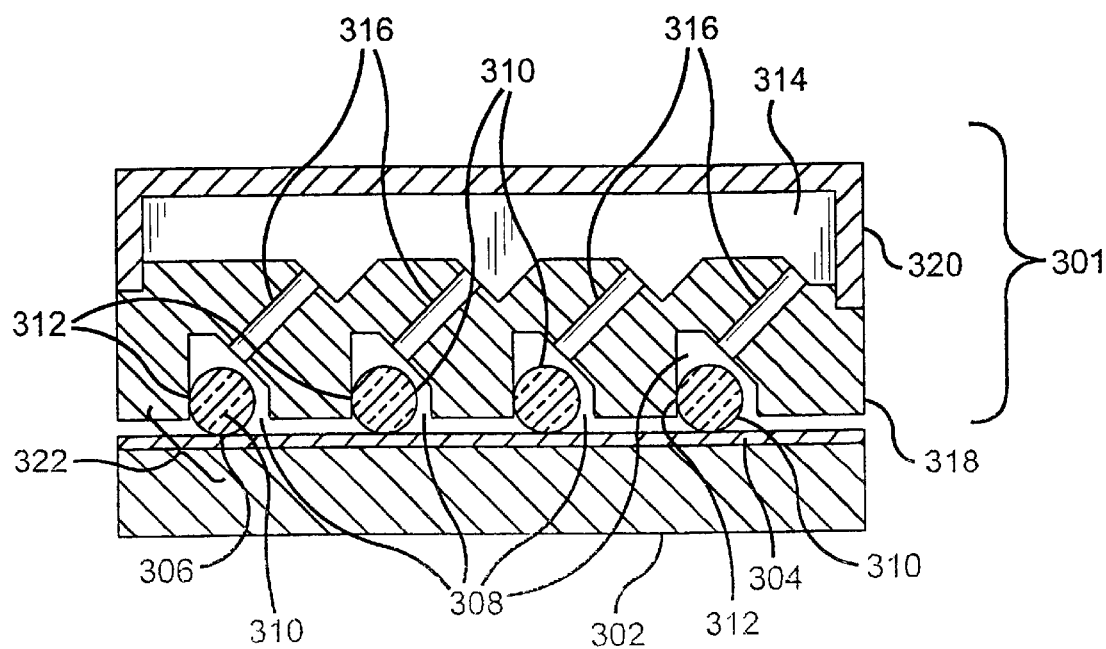
FIG. 3 is a cross-sectional view of a precision-positioning tool in which the present invention is embodied.

In an alternate embodiment of the invention, as embodied herein and as shown in FIG. 3, the present invention includes a precision-positioning tool 300 for use with a substrate 302 having a substantially planar surface that is at least partially coated with an adhesive layer 304.

The precision-positioning tool 300 includes a holder 301 having multiple recesses 308. Each recess 308 is configured to house an optical waveguide fiber 310 in a predetermined position. Each recess is connected to a pressure chamber 314 by a passageway 316 and has a reference surface 312. The pressure chamber 314 is connected to a pressure source 402 that increases or decreases the pressure in the pressure chamber 314 in relation to the ambient atmospheric pressure surrounding the substrate 302 and the precision-positioning tool 300. The pressure source must be capable of supplying sufficient negative pressure or suction to hold the optical waveguide fibers 310 in the recess 308 as the precision-positioning tool 300 is moved about. Furthermore, the pressure source must be capable of supplying sufficient positive pressure to properly seat the optical waveguide fibers 310 in the adhesive layer 306 while registering the optical waveguide fibers 310 against the reference surfaces 312 of the recesses 308.

The holder 301 may be made from any dimensionally stable material having high density and high hardness such as, for example, stainless steel. The holder 301 may be made by machining, molding or any other manufacturing process known to those skilled in the pertinent art that can maintain the required tolerances for alignment of the resulting optical waveguide fiber array block with the optical waveguides of an optical waveguide device.

When the tool 300 is in proximity to the surface 304, the reference surfaces 312 together with the surface 304 form a series of temporary alignment structures 322 for positioning the optical waveguide fibers 310. The temporary alignment structures 322 will hereinafter be referred to as virtual V-grooves. Each reference surface 312 is inclined at some angle such as, for example 90 degrees, to the surface 304 thereby forming a series of virtual V-grooves 322. The virtual V-grooves 322 defined by the reference surfaces 312 and the surface 304 precisely locate the optical waveguide fibers 310 with respect to one another. Typically the reference surfaces 312 are positioned so that an optical waveguide fiber array made using the precision-positioning tool 300 has a pitch of 250 µm. The precision-positioning tool 300 of the present invention may be made to produce optical waveguide fiber arrays with different pitches, for example 500 µm, 750 µm and 1000 µm. The variation in the fiber to fiber pitch of an optical waveguide fiber array made according to the present invention depends upon the manufacturing tolerances in locating the reference surfaces 312 with respect to one another and the application of sufficient force per unit length to properly seat the optical waveguide fibers 310 in the virtual V-grooves 322.

The embodiment of the invention as shown if FIG. 3 is a precision-positioning tool 300 that includes holder 301 having a base 318 and cover 320. The cover 320 engages the base 318 to form the chamber 314. The chamber 314 is connected to a pressure source 402 that can selectively modify the pressure of chamber 314. An example of a commercially available pressure source is a standard pressure network with a pressure controller and a venturi device to provide negative pressure, available from FESTO. The base 318 includes a number of recesses or channels 308. When the recesses 308 are loaded with optical waveguide fibers 310 the pressure source decreases the pressure in the chamber 314 sufficiently to create suction on the optical waveguide fibers 310 through the passageways 316. When the optical fibers 310 are positioned in the virtual V-grooves 322 the pressure source increases the pressure in the chamber 314. Preferably, the pressure in the chamber 314 is raised to a level to position the optical waveguide fibers 310 against the reference surfaces 312 and the surface 304. The force of this pressure seats the optical fibers in the adhesive layer 304. The pressure source may be regulated by means known to those of ordinary skill in the art to control the stresses in the optical waveguide fibers 310 and to ensure that the optical axes of the optical fibers 310 are co-planar where the optical fibers 310 are coupled to the substrate 302.

It will be apparent to those skilled in the pertinent art that modifications and variations may be made to chamber 314 of the present invention depending on the manufacturing considerations for the precision-positioning tool 300. For example, the chamber 314 may be replaced with a manifold (not shown) that connects each of the recesses 308 to the pressure source 402.

Preferably the pressure chamber 314 and the passageways 316 are arranged in such a manner so as to apply equal force per unit length to the optical waveguide fibers 310. Each recess 308 may have more than one passageway 316 connecting the recess 308 to the pressure chamber 314. Applying an equal force per unit length to the optical waveguide fibers 310 seats all of the optical waveguide fibers 310 a uniform depth into the adhesive layer 306.

When either the precision-positioning tool 300 or the substrate 302 is transparent to ultra-violet light, the adhesive layer 304 may be formed from an ultra-violet curable adhesive. For example, Vitralite 71057105 available from Eleco Produit, and UV200 available from Daikin Industries, Osaka Japan. The used of an ultra-violet curable adhesive allows the optical waveguide fibers 310 to be fixed in position while the optical waveguide fibers 310 are held in the virtual V-grooves 322. Ultra-violet curable adhesives have the advantage of curing rapidly and shifting very little during the cure cycle compared to other adhesive types.

It will be apparent to those skilled in the pertinent art that another type of adhesive may be substituted for the ultra-violet adhesive, for example thermally curable adhesives, two-part epoxies or time setting adhesives, and that the present invention may be readily modified to accommodate the type of adhesive used to form the adhesive layer 304.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method for making a fiber array, the method comprising the steps of:

loading a plurality of optical waveguide fibers into a positioner having a plurality of reference surfaces, and holding the plurality of optical waveguide fibers against the positioner using suction;

applying adhesive to a planar substrate, thereby forming an adhesive-coated planar substrate;

forming a plurality of virtual V-grooves with the adhesive coated planar substrate and the plurality of reference surfaces;

placing the plurality of optical waveguide fibers in the plurality of virtual V-grooves; and coupling the plurality of optical waveguide fibers to the planar substrate.

2. The method of claim 1 wherein the step of placing comprises the step of using gaseous pressure to seat the plurality of optical waveguide fibers in the plurality of virtual V-grooves.

3. The method of claim 1 wherein the step of forming the plurality of virtual V-grooves includes the step of positioning the positioner proximate to the adhesive-coated planar substrate.

4. The method of claim 1 wherein the step of forming the plurality of virtual V-grooves includes the step of positioning the adhesive-coated planar substrate proximate to the positioner.

5. An optical waveguide fiber array made according to the method of claim 1.

6. The method of claim 1 wherein the step of coupling comprises the step of curing the adhesive layer.

* * * * *